United States Patent [19]

Sazaki

[11] 4,098,473
[45] Jul. 4, 1978

[54] BAIL LATCHING AND RELEASING MECHANISM FOR SPIN FISHING REEL

[75] Inventor: Kounin Sazaki, Fukuyama, Japan

[73] Assignee: Ryobi, Ltd., Fuchu, Japan

[21] Appl. No.: 773,737

[22] Filed: Mar. 2, 1977

[30] Foreign Application Priority Data

Mar. 4, 1976 [JP] Japan .............................. 51-25654[U]

[51] Int. Cl.² ............................................ A01K 89/00
[52] U.S. Cl. ............................................... 242/84.2 G
[58] Field of Search ..................... 242/84.2 G, 84.2 F, 242/84.21 R, 84.21 A, 84.21 W

[56] References Cited

U.S. PATENT DOCUMENTS 3,342,442   9/1967   Brantingson ................... 242/84.2 G
3,627,223   12/1971  Monthulet ...................... 242/84.2 G Primary Examiner—George F. Mautz Attorney, Agent, or Firm—Sughrue, Rothwell, Mion, Zinn and Macpeak

[57] ABSTRACT

An internal bail arm latching and release mechanism for a spinning reel includes a spring biased bail arm 12 secured at one end to a pivot cam 14 rotatably mounted on a post 11 extending out from a support housing 8 integral with the reel rotor 8. The pivot cam carries a C-shaped cam face 31 of increasing radius, adapted to engage a detent 21 on a spring biased, slidably mounted, L-shaped kick lever 19 having a trapezoidal projection 28 on its upper end. The latter is positioned to strike a trip tab 26 on a stationary key plate 25, which also serves as a bearing retainer, when the rotor is turned with the bail arm cocked. This forces the kick lever inwardly to release the bail arm, and as it swings over to the rewind position the cam face 31 moves the kick lever further inward to thereby provide rotational clearance between the projection 28 and the tab 26.

6 Claims, 4 Drawing Figures

BAIL LATCHING AND RELEASING MECHANISM FOR SPIN FISHING REEL

BACKGROUND OF THE INVENTION

This invention relates to a bail latching and releasing mechanism for an arm spool type of spin fishing reel.

The prior art bail control mechanisms are generally characterized by a number of exposed and protruding parts of sharp and irregular shape, such as the pivot cam at one end of the bail arm, the latching detent engageable with the cam, the fixed trip release for the detent, etc. The fishing line has a great tendency to become entangled in such parts when, as often happens, several turns of the line backlash and spill off of the reel spool, and the exposure of these parts also promotes their wear and breakage, snags clothing, etc.

SUMMARY OF THE INVENTION

According to the present invention, an automatic bail control mechanism includes a kick lever having a detent adapted to engage a bail arm pivot cam to thereby lock the bail arm in a cocked or casting position. The kick lever is disengaged from the bail arm pivot cam when it strikes a key plate, which also serves as a rotor bearing holder. The pivot cam presents an increasing radius as the spring biased bail arm, after release, returns to the rewind or retrieve position, whereby the kick lever is cammed out of the key plate path to enable free rotation of the rotor and unlatched bail arm.

BRIEF DESCRIPTION OF THE DRAWINGS

The accompanying drawings illustrate a preferred embodiment of the present invention, wherein.

DETAILED DESCRIPTION OF THE PREFERRED EMBODIMENT

Figure 1:
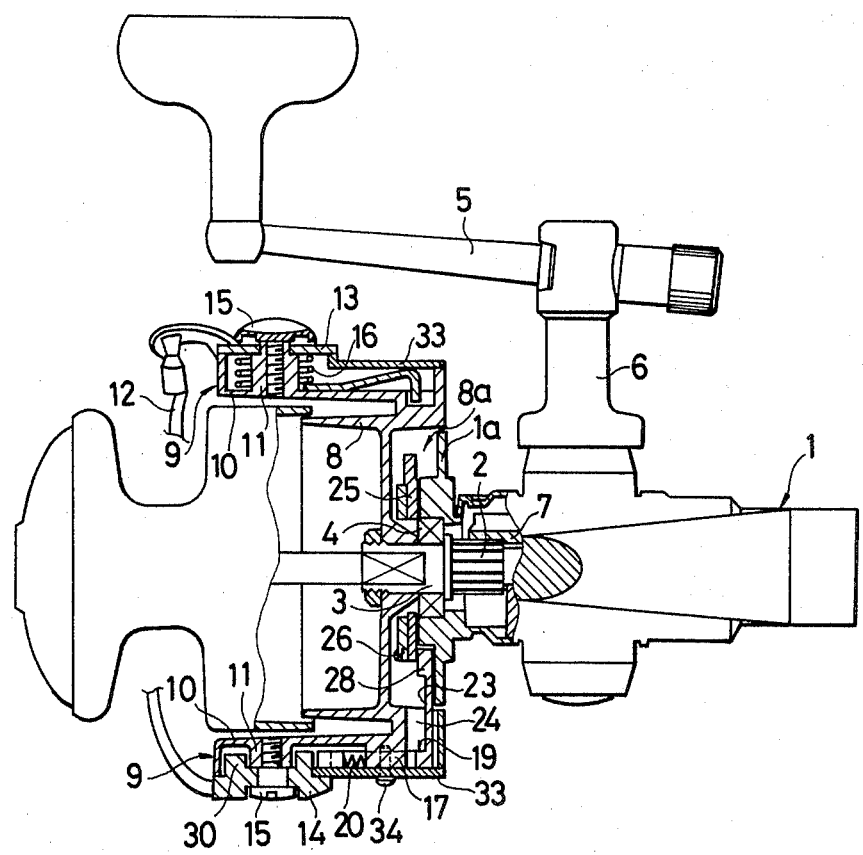
FIG. 1 shows a side view, partly in cross section, of a spinning reel equipped with a bail latching and releasing mechanism according to the present invention.

Referring now to the drawings, a pair of support housings 9, 9 are symmetrically disposed on diametrically opposite sides of a rotor 8, which is mounted through a bearing 4 on a tubular shaft 3 to a reel body 1. The shaft 3 has a pinion 2 at one end, and is rotated by a handle 5 coupled thereto by a main gear 7 fitted on the inner end of a handle shaft extending through a housing 6. A bail arm 12 is pivotally mounted on posts 11, 11 projecting radially outwardly from the bottom walls of the respective support housings 9, 9. The bail arm is coupled to a lever 13 at one end and to a pivot cam 14 at the other end, both of which are pivotally mounted to the posts 11, 11 by shouldered step screws 15, 15. A torsion spring 16 is coiled about one of the posts 11, and is connected at one end to the bail arm lever 13 and at the other end to a wall of the upper support housing 9, to thereby bias the bail arm toward a rewind or retrievel position. In the other or lower support housing 9, a square column 17 projects from the bottom wall thereof at a proper spacing from the pivot post 11. A kick lever 19 having an elongated slot 18 in one portion thereof is slidably supported within the lower support housing 9 on the square column 17, which engages the slot 18. A spring 20 is disposed between one end of the slot 18 and the column 17, thereby biasing the kick lever 19 towards the pivot cam 14. The kick lever 19 has a detent projection 21 at one end thereof, which is adapted to engage and latch the pivot cam 14.

Figure 4:
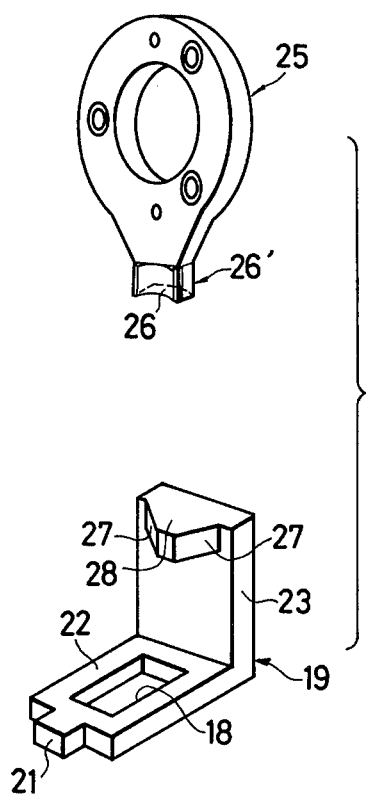
FIG. 4 shows an exploded perspective view of the kick lever key plate bearing holder and the kick lever.

The kick lever 19 according to the present invention has an L-shaped contour, as viewed in FIG. 4, which consists of a horizontally extending portion 22 having the slot 18 and detent projection 21, and an upright portion 23 which extends radially inwardly through a peripheral groove 24 in the rotor 8. The top of the upright portion 23 is engageable with the trip tab 26 of a kick lever key plate 25, which also serves as a retainer for the bearing 4. The key plate is fastened by screws to the front end of the reel body 1 in such a manner as to be positioned within a rear recess 8a of the rotor 8 as viewed in FIG. 1. The recess is closed by a reel body flange 1a to protect the bearing and internal mechanism.

The top of the upright portion 23 of the L-shaped kick lever 19 is formed with a horizontally extending trapezoid-shaped projection 28 having two inclined, symmetrical side faces 27, 27. The trip tab 26 opposing the projection 28 has an arcuate or curved rear face 26'.

The kick lever 19 is positioned such that the inclined faces 27 of the projection 28 are in the path of the tab 26 of the key plate 25 when the cocked bail arm is rotated, whereby the tab cams the kick lever inwardly to a retracted position.

Figure 2:
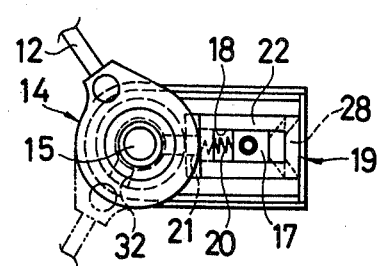
FIG. 2 shows the positional relationship between the bail arm pivot cam and the kick lever in the mechanism of FIG. 1, with the cover plate removed.
Figure 3:
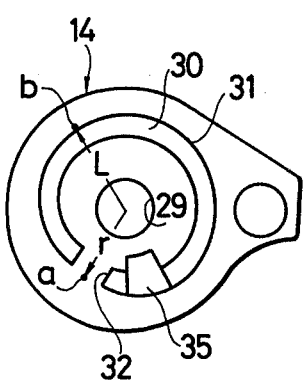
FIG. 3 shows a rear view of the bail arm pivot cam.

Referring to FIGS. 2 and 3, the pivot cam 14 has a sleeve portion 30 which projects from one side of the cam around a central hole 29 for the shoulder of the step screw 15, whereby the outer peripheral surface of the sleeve portion serves as a cam face 31. The sleeve portion 30 is C-shaped rather than being a full or closed circle, and has an opening 32 for receiving the detent 21 of the kick lever 19, the opening being located in a portion of the cam face which has the smallest radius $r$ from the center of the pivot hole. The position of the opening 32 is such that the detent 21 engages or enters it when the bail arm 12 is manually swung into a cocked position, and the detent contacts the large radius portion $b$ of the cam face 31 when the bail arm is in a rewind position, as shown by the solid lines in FIG. 2. The relative size of the pivot cam 14 and the kick lever 19 should be such that when the detent 21 is in contact with the cam face portion $b$, the projection 28 of the kick lever remains positively spaced or disengaged from the trip tab 26 of the key plate 25, whereby free rotation and line retrieval is enabled.

When the bail arm is in the fishing line take-up or retrieval position the detent 21 is held in contact with the portion $b$ of the cam face 31 so that the kick lever 19 is urged to the right as viewed in FIG. 2 against the force of the spring 20, whereby the trapezoid-shpaed projection 28 clears the stationary trip tab 26 of the key plate 25. Thus, there is no fear under this condition that the rotation of the rotor will bring about unwanted contact between the projection and the tab.

If the bail arm 12 is cocked the kick lever 19 slides to the left as viewed in FIG. 2, due to the force of the spring 20, thereby engaging the detent 21 in the cam face opening 32, whereby the bail arm is securely latched. Simultaneously, the upright portion 23 of the lever 19 is also moved to the left, as viewed in FIG. 1, into the path of the trip tab 26.

If the handle is turned to rotate the rotor with the bail arm cocked, an inclined side face 27 of the projection 28 will engage the tab 26 to thereby cam the kick lever 19 to the right in FIG. 1 and unlatch or release the bail arm. The tensioned spring 16 will then swing the bail arm toward the rewind position, and as the pivot cam 14 rotates the increasing radius of the cam face 31 will urge the kick lever farther to the right, against the force of the spring 20, until the detent 21 reaches the large radius portion b of the cam face, at which position the projection 28 is fully removed from the path of the trip tab 26. Reference numerals 33 in FIG. 1 designate cover plates for closing the support housings 9, fastened thereto by screws 34. Reference numeral 35 in FIG. 3 designates an upstanding abutment extending radially inwardly from the cam sleeve portion 30 for haltingly engaging a similar abutment or stopping lug (not shown) integral with the support housing 9 and disposed in the rotational path of the abutment 35, to thereby limit the return travel of the released bail arm and pivot cam.

The force of the kick lever impact is adjustable by merely changing the curvature of the arcuate face 26' of the trip tab 26.

What is claimed is:

1. A bail latching and releasing mechanism for a spinning reel, which includes a bail arm (12) pivotally mounted at both ends on diametrically opposite sides of a rotor (8) for swinging movement thereacross between a cocked and a rewind position, a torsion spring (16) biasing the bail arm toward the rewind position, a kick lever (19), a pivot cam (14) mounted on one end of the bail arm, the kick lever and the pivot cam being slidably and pivotally mounted, respectively, on a support housing (9) of the rotor, a spring (20) biasing the kick lever toward the pivot cam and into engagement therewith, the kick lever locking the pivot cam and bail arm in the cocked position, and adapted to be cammed toward a reel body (1) to a retracted position, following rotation of the rotor, to thereby release the bail arm and pivot cam; characterized in that;
    (a) the kick lever has an L-shaped configuration including a radially extending upright portion (23),
    (b) a key plate (25), which also serves as a retainer for a rotor bearing, is mounted to the reel body and disposed in the rotational path of the upright portion of the kick lever when the bail arm is cocked, and
    (c) the pivot cam has a cam face (31) having a C-shaped contour of changing radius with respect to the axis of the pivot cam, said cam face having a recess (32) therein in the smallest radius portion for engaging the kick lever to lock the pivot cam and bail arm in the cocked position.

2. A bail mechanism as defined in claim 1, wherein the top of the upright portion of the kick lever carries a trapezoidal-shaped projection, and the key plate carries an arcuate shaped trip tab disposed to engage the projection to thereby cam the kick lever toward its retracted position.

3. A bail mechanism as defined in claim 1, wherein the kick lever includes an axially extending portion having an elongated slot therein, and the support housing includes a radially outwardly extending column slideably received in the slot.

4. A bail mechanism as defined in claim 2, wherein the kick lever includes an axially extending portion having an elongated slot therein, and the support housing includes a radially outwardly extending column slideably received in the slot.

5. A bail mechanism as defined in claim 3, wherein the axially extending portion of the kick lever carries a detent on one end thereof adapted to engage the recess and follow the cam face.

6. A bail mechanism as defined in claim 4, wherein the axially extending portion of the kick lever carries a detent on one end thereof adapted to engage the recess and follow the cam face.

* * * * *